United States Patent
Hu

(10) Patent No.: US 9,412,418 B2
(45) Date of Patent: Aug. 9, 2016

(54) IN-BOX QUICK RELEASE ACCESS DEVICE STRUCTURE

(71) Applicant: CHENBRO MICOM CO., LTD., New Taipei (TW)

(72) Inventor: Tseng-Hsun Hu, New Taipei (TW)

(73) Assignee: CHENBRO MICOM CO., LTD., New Taipei (TW)

( * ) Notice: Subject to any disclaimer, the term of this patent is extended or adjusted under 35 U.S.C. 154(b) by 228 days.

(21) Appl. No.: 14/319,834

(22) Filed: Jun. 30, 2014

(65) Prior Publication Data
US 2015/0382494 A1 Dec. 31, 2015

(51) Int. Cl.
| | |
|---|---|
| *A47B 96/00* | (2006.01) |
| *A47K 1/00* | (2006.01) |
| *A47K 5/00* | (2006.01) |
| *E04G 5/06* | (2006.01) |
| *F16L 3/08* | (2006.01) |
| *F21V 21/00* | (2006.01) |
| *F21V 35/00* | (2006.01) |
| *G11B 33/12* | (2006.01) |
| *G06F 1/18* | (2006.01) |
| *A47B 96/06* | (2006.01) |
| *A47G 29/00* | (2006.01) |
| *E04G 3/00* | (2006.01) |
| *G06F 1/16* | (2006.01) |
| *H05K 5/00* | (2006.01) |
| *H05K 7/00* | (2006.01) |

(52) U.S. Cl.
CPC ............... *G11B 33/124* (2013.01); *G06F 1/18* (2013.01); *G06F 1/187* (2013.01); *G06F 1/1658* (2013.01); *G11B 33/125* (2013.01)

(58) Field of Classification Search
CPC ..... G06F 1/1656; G06F 1/1658; G06F 1/187; G11B 33/124; G11B 33/125
USPC ............ 248/220.21, 220.22, 221.11, 222.11, 248/222.12, 918; 361/679.31, 679.33, 361/679.34, 679.36, 679.37
See application file for complete search history.

(56) References Cited

U.S. PATENT DOCUMENTS

| | | | | |
|---|---|---|---|---|
| 6,040,980 | A * | 3/2000 | Johnson | G11B 33/124 312/333 |
| 6,122,165 | A * | 9/2000 | Schmitt | G06F 1/184 361/679.31 |
| 6,166,901 | A * | 12/2000 | Gamble | G06F 1/184 248/560 |
| 7,355,846 | B1 * | 4/2008 | Chen | G06F 1/187 248/618 |
| 7,375,922 | B2 * | 5/2008 | Chen | G06F 1/184 360/97.19 |
| 7,571,884 | B2 * | 8/2009 | Chen | G11B 33/124 248/291.1 |
| 8,526,174 | B2 * | 9/2013 | Hsieh | G11B 33/124 248/27.1 |
| 2003/0095377 | A1 * | 5/2003 | Goodman | G06F 1/184 361/679.36 |

(Continued)

*Primary Examiner* — Syed A Islam
*Assistant Examiner* — Taylor Morris
(74) *Attorney, Agent, or Firm* — Muncy, Gleissler, Olds & Lowe, P.C.

(57) ABSTRACT

An in-box quick release access device mounting structure includes a rigid holder shell including an accommodation chamber surrounded by a bottom panel and two opposite side panels thereof, a first positioning member and a first locating member located at the bottom panel and defining a mounting space therebetween, a second positioning member and a second locating member respectively located at the two side panels, and a retaining mechanism including a first retaining plate fastened to the first positioning member and adapted for detachably securing a small access device in the mounting space and a second retaining plate fastened to the second locating member and adapted for detachably securing a large access device in the accommodation chamber.

14 Claims, 10 Drawing Sheets

(56) References Cited

U.S. PATENT DOCUMENTS

2004/0047122 A1* 3/2004 Chen .................... G06F 1/184
                                                    361/679.33
2010/0002366 A1* 1/2010 Pav ..................... G06F 1/187
                                                    361/679.02
2011/0134596 A1* 6/2011 Cao ..................... G06F 1/187
                                                    361/679.31

* cited by examiner

IN-BOX QUICK RELEASE ACCESS DEVICE STRUCTURE

BACKGROUND OF THE INVENTION

1. Field of the Invention

The present invention relates to access device mounting technology and more particularly, to an in-box quick release access device mounting structure, which comprises a holder shell defining therein an accommodation chamber for accommodating a large access device and a mounting space in the accommodation chamber for accommodating a small access device, and a retaining mechanism that comprises a first retaining plate mounted in the holder shell for detachably securing a small access device in the mounting space and a second retaining plate mounted at one lateral side of the holder shell for detachably securing a large access device in the accommodation chamber.

2. Description of the Related Art

With the continuous development of computer technology, computer hardware equipments are created having the characteristics of versatile functions, high operating speed and small size for multipurpose applications. In a small sized electronic equipment, the number of communication ports and recording media and apparatus (disk drive, hard disk, CD-ROM, burner programmer, etc.) is limited. In consequence, the mounting and dismounting arrangement between the outer case of the computer and the internal recording media and apparatus must be simple and space saving.

A computer server or telecommunication cabinet has a large amount of media storage devices (hard disks, CD-ROMs, burner programmers mounted inside the server case or cabinet housing thereof. To facilitate maintenance and replacement of these media storage devices, the server case or cabinet housing of the computer server or telecommunication cabinet or the related media storage device mounting structures must be made detachable. The manufacturing cost of the media storage device mounting structures shall also be taken into account. Further, for long term operation, system stability and the convenience in maintenance and replacement of the component parts are important factors.

According to conventional techniques, screws are commonly used to fasten media storage devices in the server case or cabinet housing of a computer server or telecommunication cabinet. It takes much time and labor to mount or dismount a media storage device, complicating the maintenance or replacement work. If the server case or cabinet housing has a low profile, the internal interface cards, hard disks and cables can hinder the mounting and dismounting of the screws. During the mounting or dismounting operation, screws can get lost easily. Further, if the sizes of the screws do not fit, the screw holes in the media storage devices can be damaged. Further, if clasps and snaps are used to secure media storage devices, these media storage devices can easily be forced out of place upon an impact or vibration during the delivery.

Further, different sizes of media storage devices, such as 3.5-inch, 2.5-inch and 1.8-inch media storage devices are commercially available. 3.5-inch hard disks are commonly used in desk computers, servers, cloud cabinets and telecommunication cabinets. 2.5-inch hard disks are commonly used in notebook computers. 1.8-inch hard disks are designed for use in certain notebook computers. Further, 2.5-inch hard disks include magnetic hard disks, solid state disks, and hybrid drives. In a computer server or telecommunication cabinet, partition plates are installed to inside the inside space of the server case or cabinet housing into multiple accommodation chambers for accommodating media storage devices individually. These partition plates are not detachable or replaceable for allowing modification of the dimensions of the accommodation chambers to fit different sizes of media storage devices, restricting the installation applications.

SUMMARY OF THE INVENTION

The present invention has been accomplished under the circumstances in view. It is therefore the main object of the present invention to provide an in-box quick release access device mounting structure, which is adapted for selectively holding one of two different sizes of access devices without using screws or any hand tool.

To achieve this and other objects of the present invention, an in-box quick release access device mounting structure of the invention comprises a holder shell made of a rigid material, and a retaining mechanism made of an elastic plastic material. The holder shell comprises a bottom panel, opposing first and second side panels respectively and vertically upwardly extended from two opposite lateral sides of the bottom panel, an accommodation chamber surrounded by the bottom panel and the first and second side panels, a first locating member obliquely extended from the bottom panel adjacent to the second side panel, a mounting space defined in the accommodation chamber and surrounded by the first positioning member and the first locating member, a second positioning member located in the first side panel at a relatively higher elevation than the first positioning member, and a second locating member located in the second side panel. The retaining mechanism comprises a first retaining plate fastened to the first locating member and facing toward the first positioning member, and a second retaining plate fastened to the second locating member and facing toward the second positioning member. Further, the first retaining plate comprises a third positioning member corresponding to the first positioning member, and a fourth positioning member corresponding to the second positioning member. The second retaining plate comprises at least one mounting leg extended from a bottom side thereof and fastened to the second locating member, and a fourth positioning member corresponding to the second positioning member. Thus, two different sizes of access devices (for example, 2.5-inch and 3.5-inch access devices) can be selectively and conveniently mounted in the mounting space or the accommodation chamber, and secured in place by the first and third positioning members or the second and fourth positioning members.

Further, the first retaining plate and the second retaining plate each comprise a finger strip at a top side thereof. Pressing the finger strip of the first retaining plate to elastically bias the first retaining plate can disengage the first retaining plate from the loaded small access device, allowing removal of the loaded small access device from the mounting space of the holder shell. Pressing the finger strip of the second retaining plate to elastically bias the second retaining plate can disengage the second retaining plate from the loaded large access device, allowing removal of the loaded large access device from the accommodation chamber of the holder shell.

DETAILED DESCRIPTION OF THE PREFERRED EMBODIMENT

Figure 1:
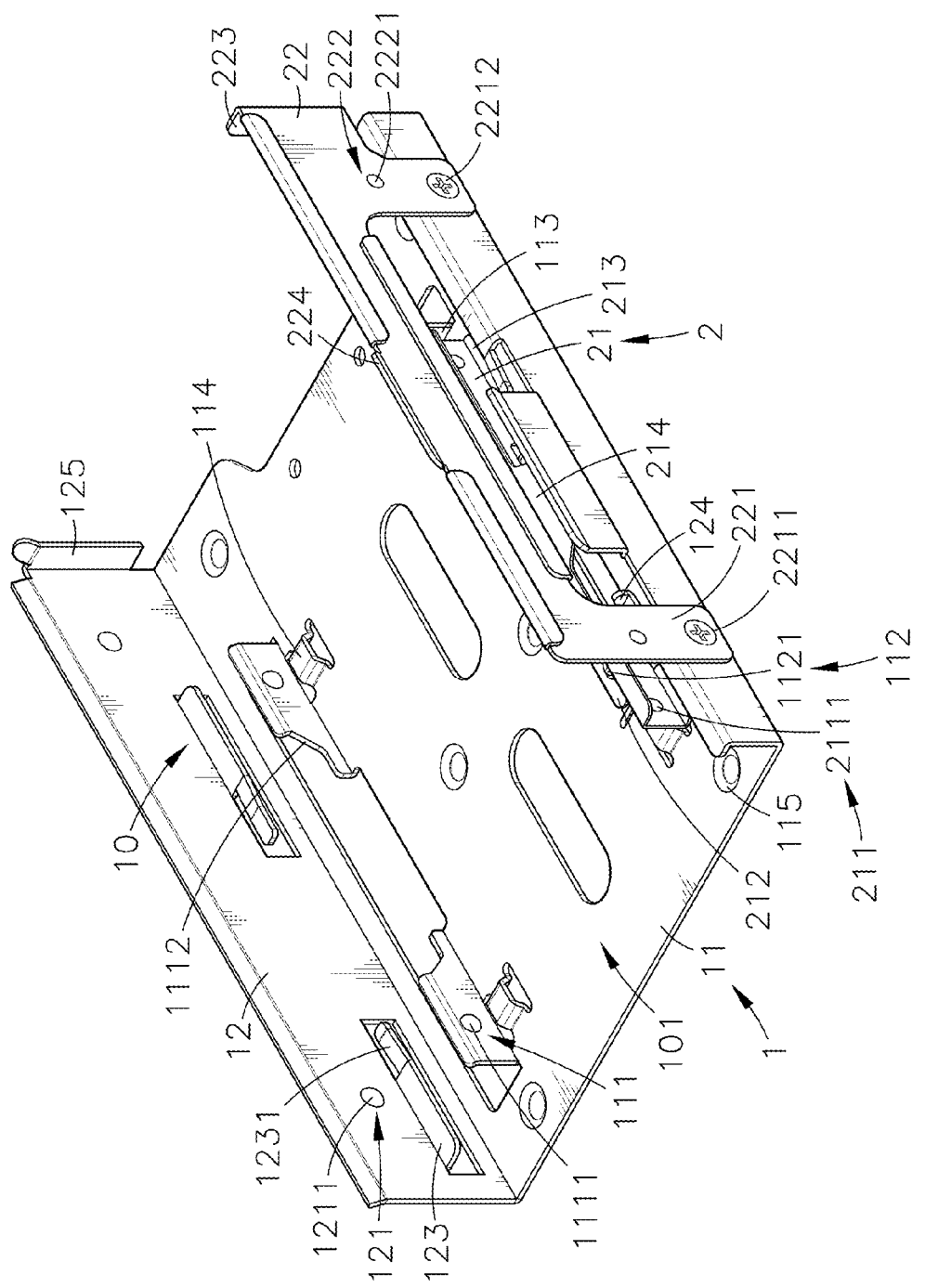
FIG. 1 is an oblique top elevational view of an in-box quick release access device mounting structure in accordance with the present invention.
Figure 2:
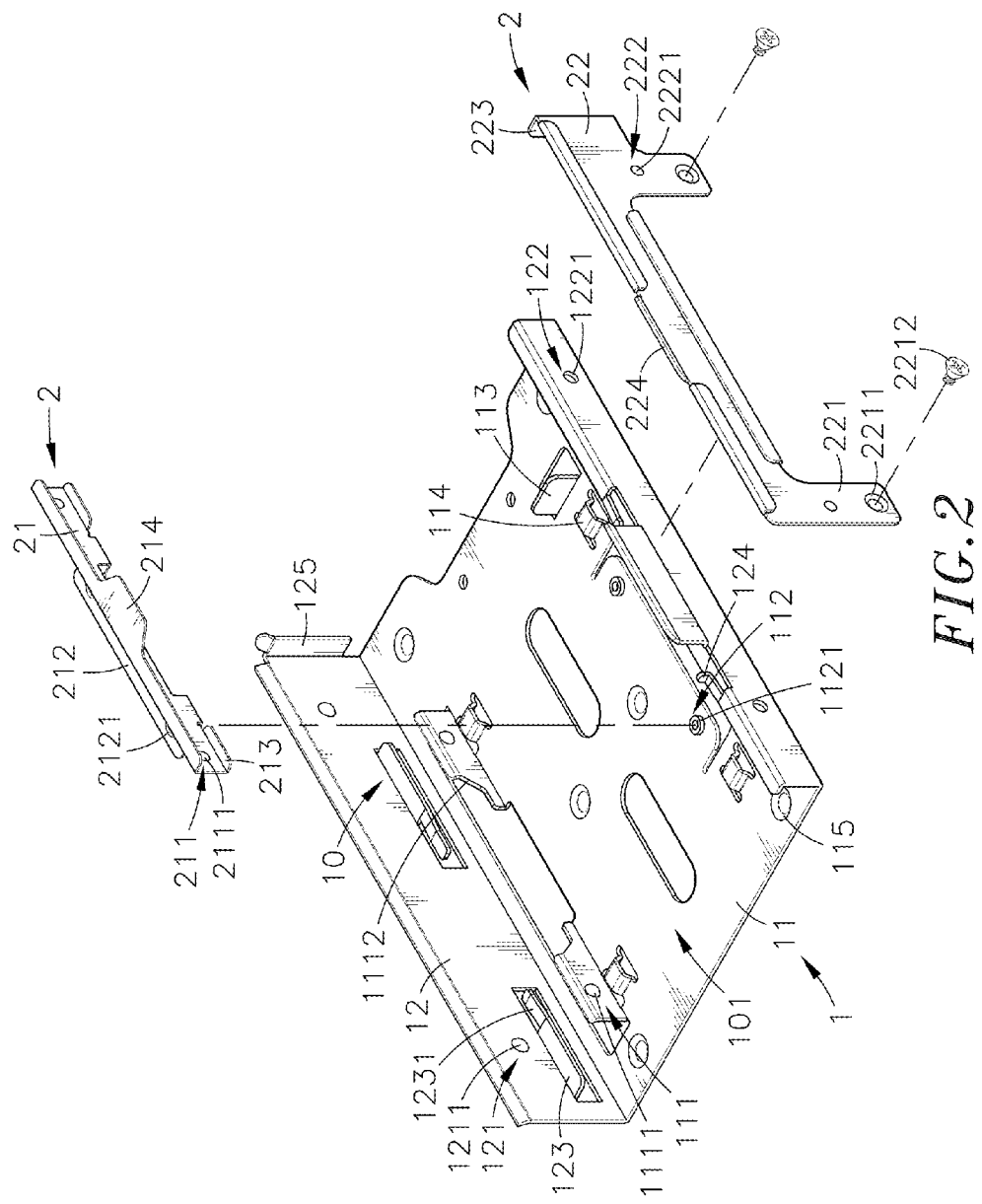
FIG. 2 is an exploded view of the in-box quick release access device mounting structure in accordance with the present invention.
Figure 3:
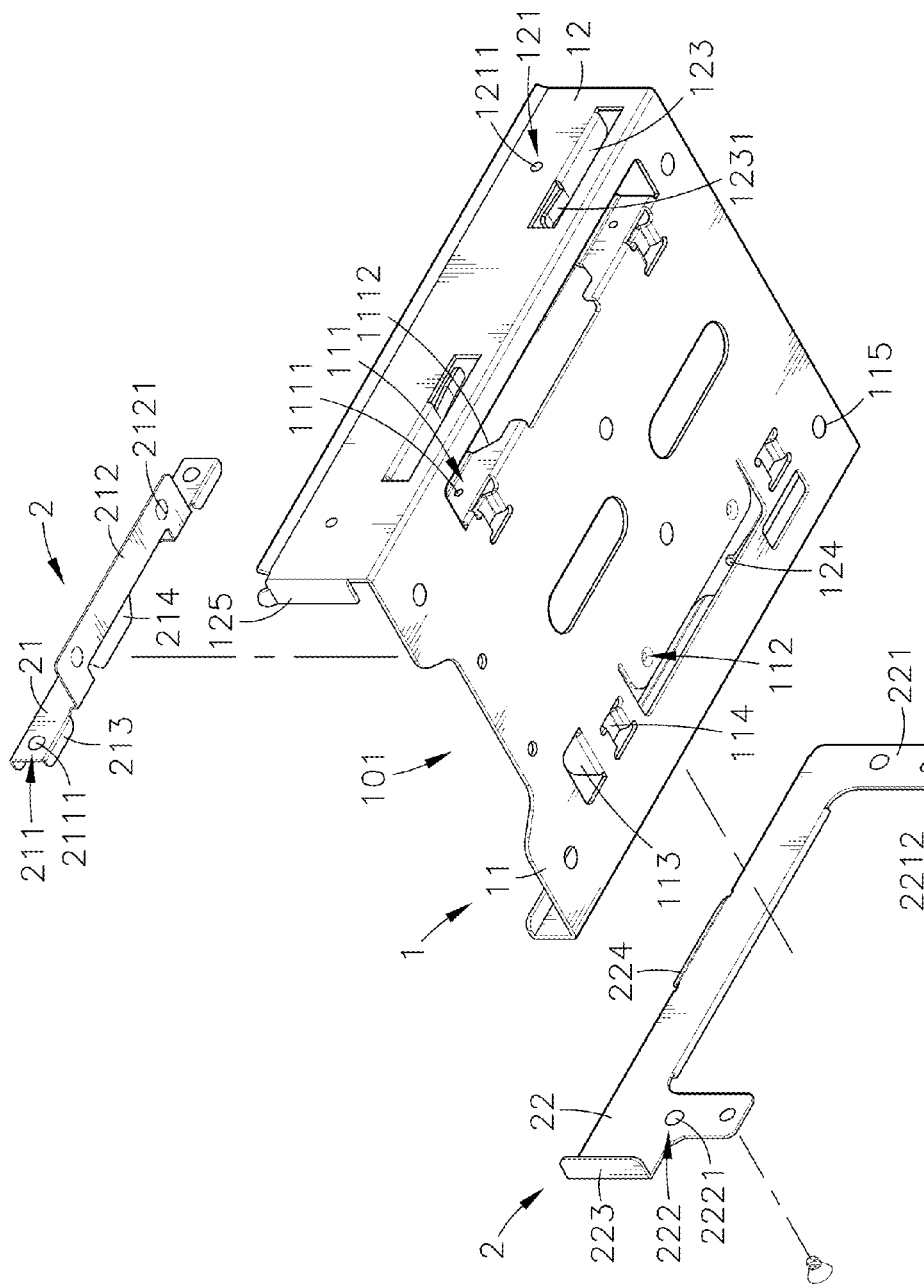
FIG. 3 corresponds to FIG. 2 when viewed from another angle.
Figure 4:
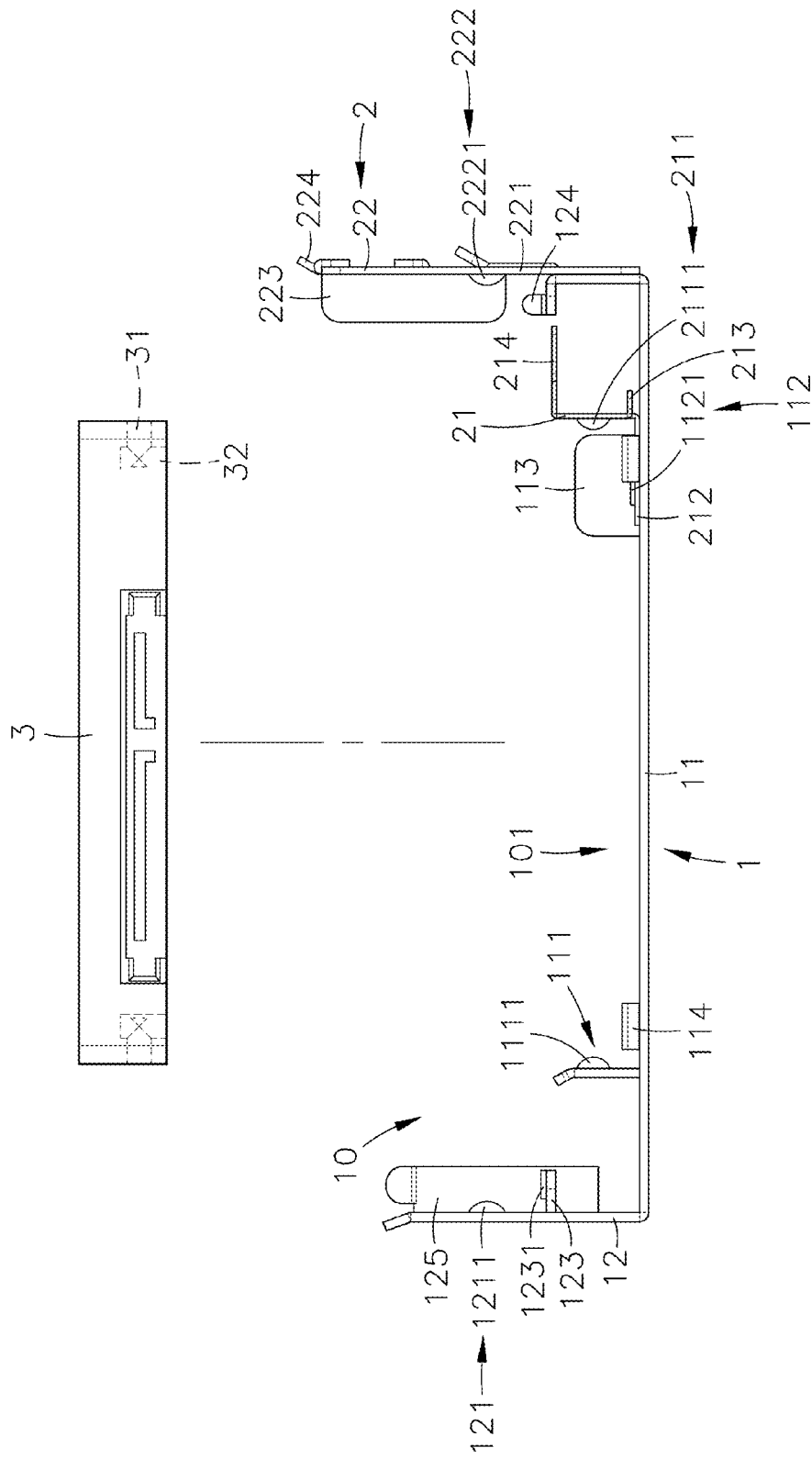
FIG. 4 is a sectional front view of the present invention before insertion of a small access device in the in-box quick release access device mounting structure.
Figure 5:
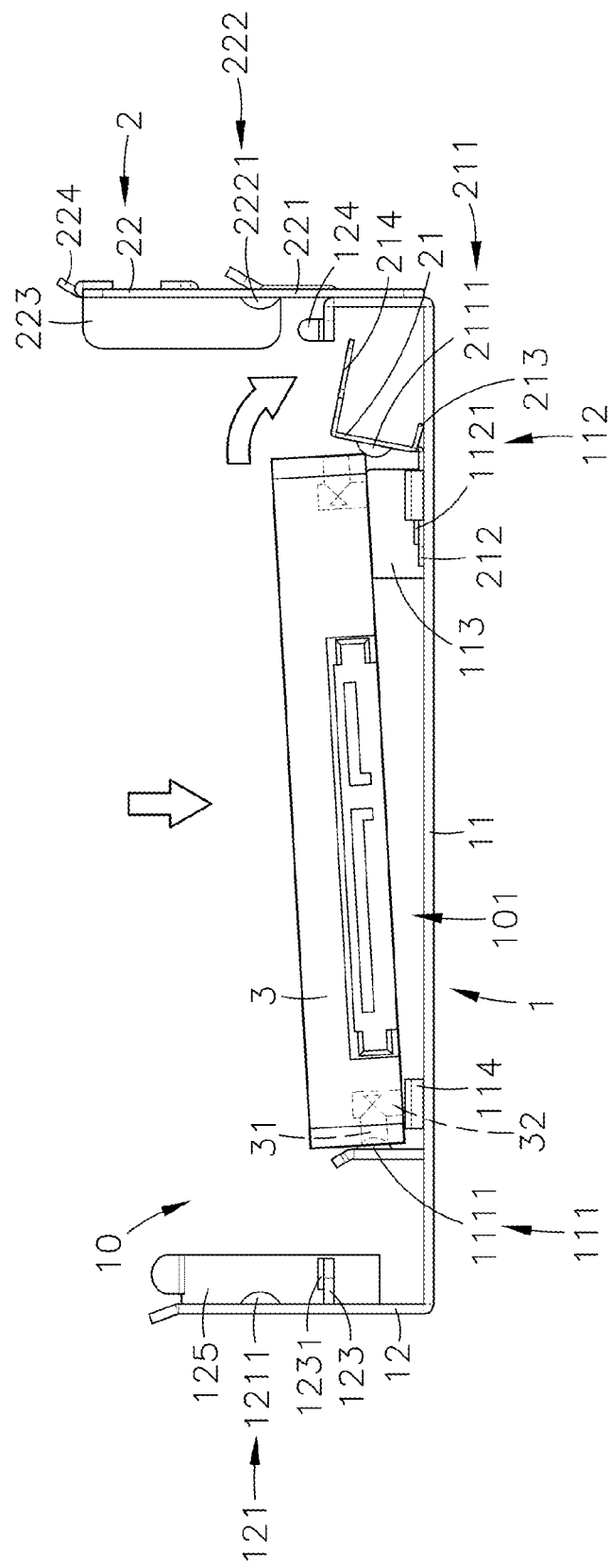
FIG. 5 corresponds to FIG. 4, illustrating the small access device obliquely inserted into the mounting space within the accommodation chamber of the holder shell.
Figure 6:
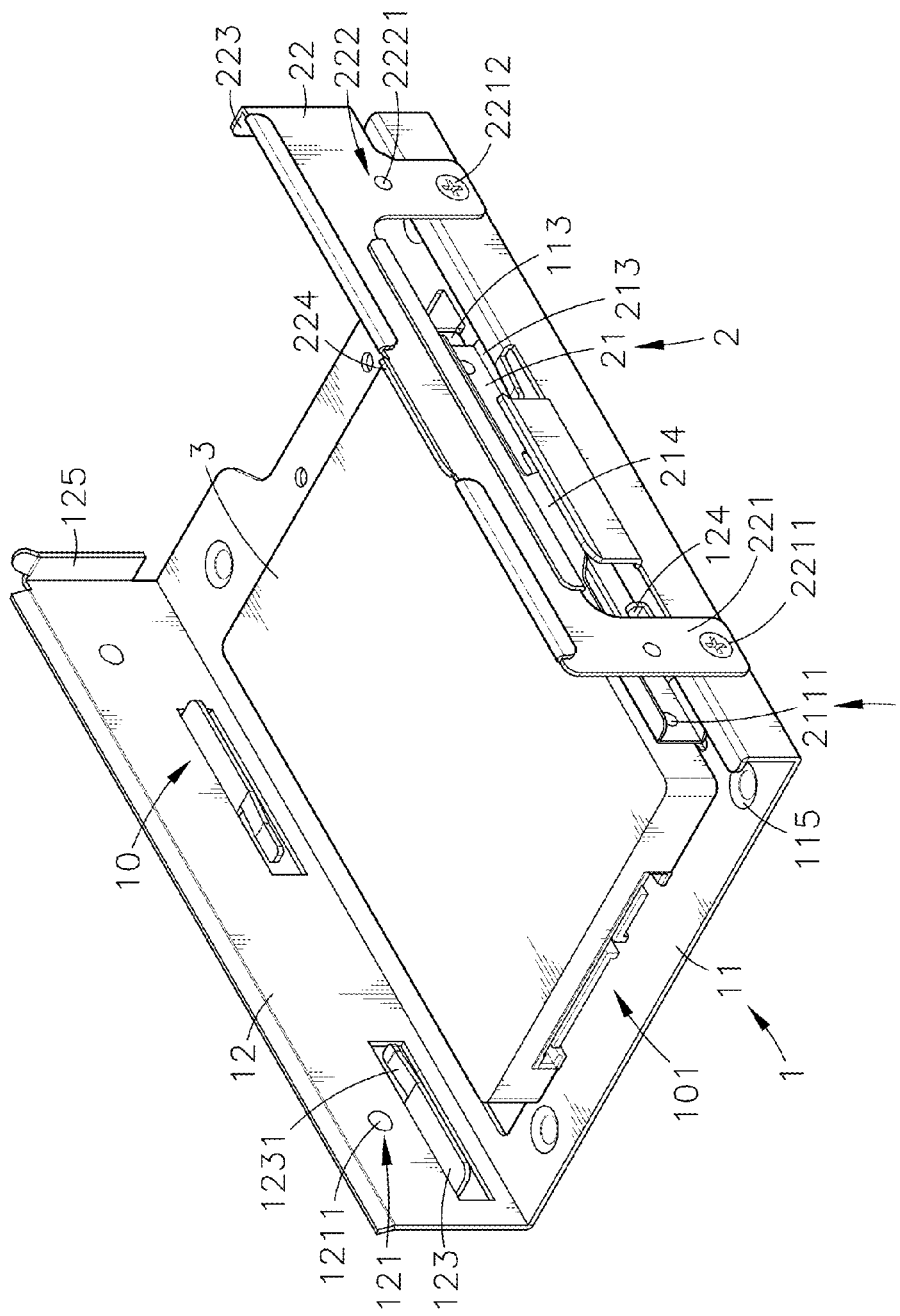
FIG. 6 is an oblique top elevational view of the present invention, illustrating the small access device mounted in the holder shell.

Referring to FIGS. 1-6, an in-box quick release access device mounting structure adapted for holding an access device 3 in accordance with the present invention is shown. The in-box quick release access device mounting structure comprises a holder shell 1 and a retaining mechanism 2.

The holder shell 1 is made of a rigid material, for example, galvanized steel, in one piece. The holder shell 1 comprises a bottom panel 11, two side panels 12 vertically upwardly extended from two opposite lateral sides of the bottom panel 11, an accommodation chamber 10 surrounded by the bottom panel 11 and the two side panels 12, a first positioning member 111 vertically upwardly extended from the bottom panel 11 adjacent to one (the left) side panel 12 in a parallel relationship and having an opening 1112 on the middle and two raised portions 1111 located at an outer wall thereof at two opposite lateral sides relative to the opening 1112, a first locating member 112 obliquely extended from the bottom panel 11 adjacent to the other (the right) side panel 12, a plurality of hollow rivet columns 1121 located in the first locating member 112, a first stop lug 113 vertically upwardly extended from the bottom panel 11 at a rear side relative to the first locating member 112, a plurality of lifting portions 114 protruded from the top wall of the bottom panel 11, a mounting space 101 defined in the accommodation chamber 10 and surrounded by the first positioning member 111, the first locating member 112 and the first stop lug 113, a plurality of mounting means 115 (such as screw holes, mounting through holes, snaps, etc) located in the bottom panel 11 and fastened to an external object (a panel of a machine box or cabinet, or a circuit board), a second positioning member 121 located in one side panel, namely, the left side panel 12 and consisting of a plurality of raised portions 1211 at a relatively higher elevation than the first positioning member 111, a second locating member 122 consisting of a plurality of mounting through holes 1221 and located in the other side panel, namely, the right side panel 12, a plurality of horizontal supporting plates 123 respectively perpendicularly extended from the two side panels 12 within the accommodation chamber 10 at an elevation below the raised portions 1211 and above the mounting through holes 1221 and the first positioning member 111, a plurality of bearing strips 1231 respectively extended from the horizontal supporting plates 123, an upright retaining lug 124 extended from one bearing strip 1231 at the right side panel 12, and a second stop lug 125 perpendicularly extended from a rear end of the left side panel 12.

The retaining mechanism 2 is made of an elastic material (for example, elastic plastics), comprising a first retaining plate 21 and a second retaining plate 22 respectively disposed corresponding to the first positioning member 111 and second positioning member 121 of the holder shell 1. The first retaining plate 21 comprises a third positioning member 211 consisting of two raised portions 2111 corresponding to the raised portions 1111 of the first positioning member 111, a bottom mounting flange 212 perpendicularly extended from a bottom side thereof between the two raised portions 2111, two rivet holes 2121 located in the bottom mounting flange 212 and respectively fastened to the hollow rivet columns 1121 in the first locating member 112 of the holder shell 1, two abutment lugs 213 perpendicularly extended from the bottom side thereof in a reversed direction relative to the bottom mounting flange 212 and respectively disposed at opposing front and rear sides, and a finger strip 214 perpendicularly extended from a middle part of an opposing top side thereof in a parallel manner relative to the abutment lugs 213. The second retaining plate 22 comprises at least one, for example, two mounting legs 221 respectively extended from opposing front and rear ends of a bottom side thereof, a plurality of mounting through holes 2211 respectively located in the mounting legs 221 corresponding to the mounting through holes 1221 of the second locating member 122, a fourth positioning member 222 consisting of a plurality of raised portions 2221 and located at the mounting legs 221, a plurality of mounting screws 2212 respectively mounted in the mounting through holes 2211 and fastened to the mounting through holes 1221 of the second locating member 122 to affix the second retaining plate 22 to the holder shell 1, a third stop lug 223 perpendicularly extended from a rear end thereof, and a finger strip 224 obliquely extended from a middle part of an opposing top side thereof.

The access device 3 to be mounted in the holder shell 1 and secured by the retaining mechanism 2 can be a 2.5-inch HDD, 3.5-inch HDD, SSD, mobile HD box or SSD adapter box. The access device 3 comprises a plurality of mounting holes 31 symmetrically located at two opposite lateral sides thereof, a plurality of position-limit holes 32 located in a bottom side thereof and respectively disposed adjacent to the mounting holes 31, and a connection interface (not shown) located at a selected location and configured subject to Integrated Development Environment (IDE), Serial ATA (SATA), Small Computer System Interface (SCSI), Serial Attached SCSI (SAS), or Fiber Channel (FC) standards.

When mounting a small size access device 3 (for example, 2.5-inch HDD), obliquely insert one lateral side of the access device 3 into the mounting space 101 within the accommodation chamber 10 of the holder shell 1 to abut against the first positioning member 111 at the bottom panel 11 of the holder shell 1 and to force the mounting holes 31 at one lateral side of the access device 3 into engagement with the respective raised portions 1111 of the first positioning member 111, and then force the other lateral side of the access device 3 downwardly over the third positioning member 211 of the first retaining plate 21 of the retaining mechanism 2 to elastically deform the first retaining plate 21, enabling the access device 3 to be supported on the lifting portions 114 above the bottom panel 11 with the rear side thereof stopped against the first stop lug 113 and the mounting holes 31 at the other lateral side of the access device 3 to be forced into engagement with the respective raised portions 2111 of the third positioning member 211 of the first retaining plate 21, and thus the access device 3 is firmly secured to the inside of the mounting space 101 inside the holder shell 1. Thus, this access device 3 installation procedure is simple without using screws or any hand tool.

Figure 7:
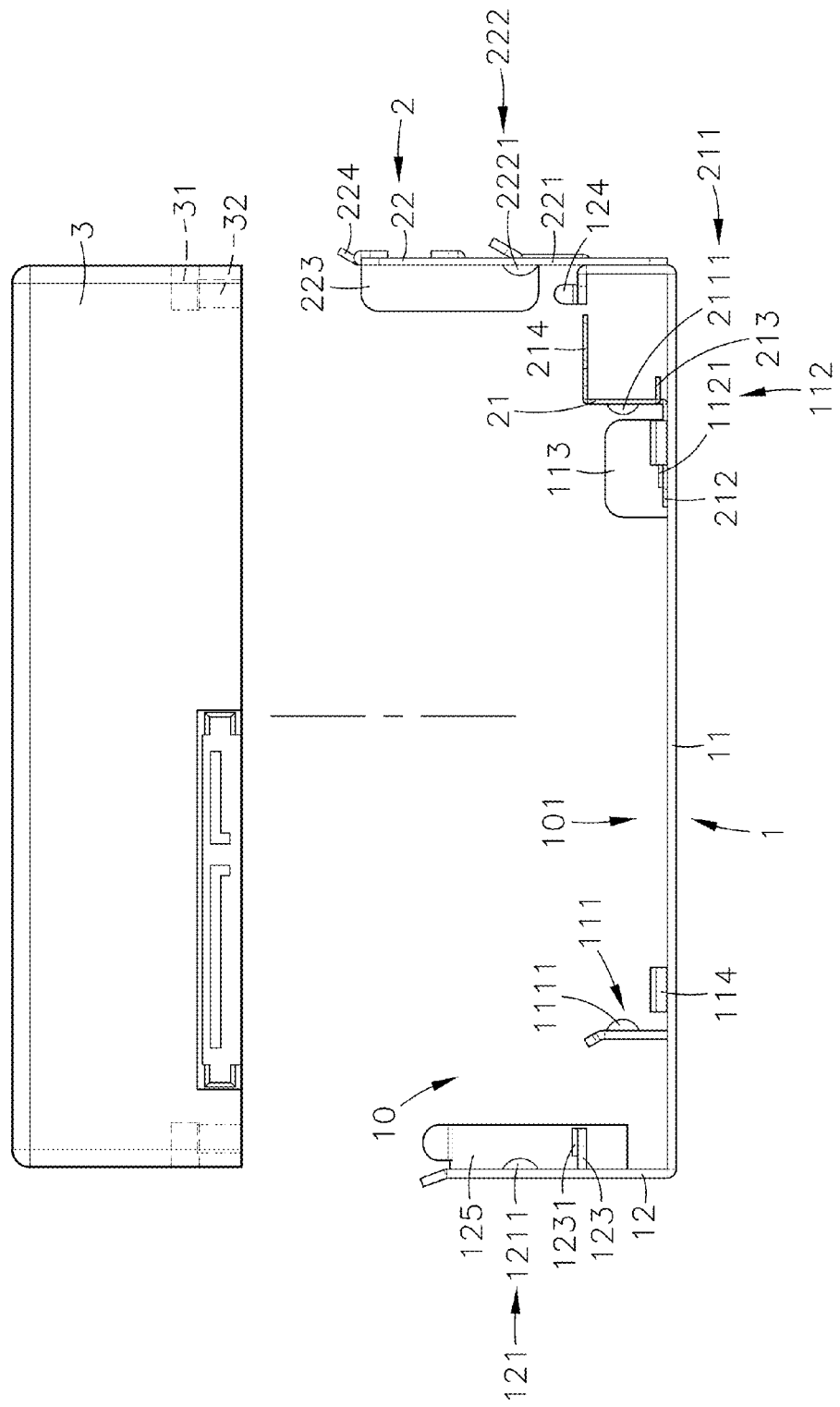
FIG. 7 is a sectional front view of the present invention before insertion of a large access device in the in-box quick release access device mounting structure.
Figure 8:
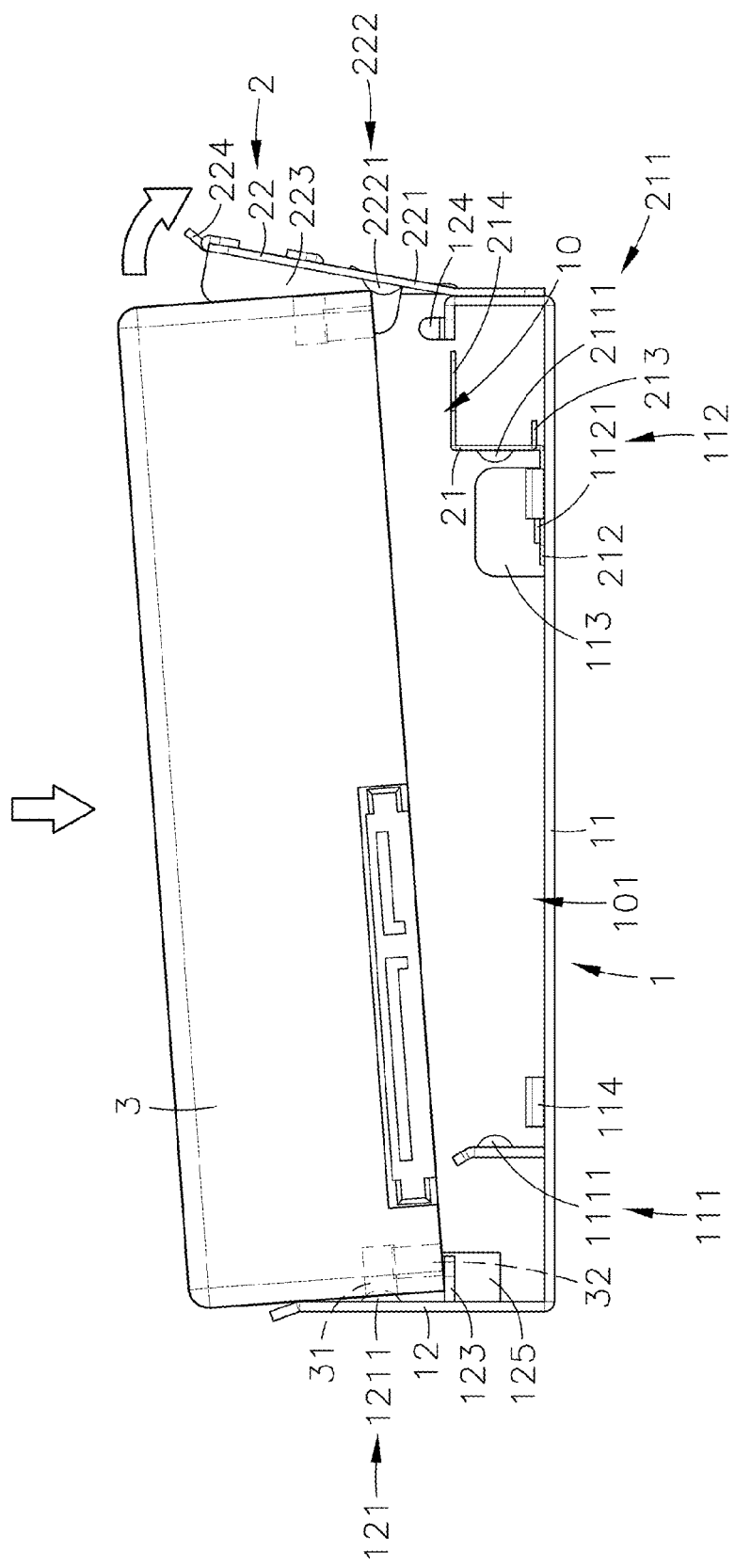
FIG. 8 corresponds to FIG. 7, illustrating the large access device obliquely inserted into the mounting space within the accommodation chamber of the holder shell.
Figure 9:
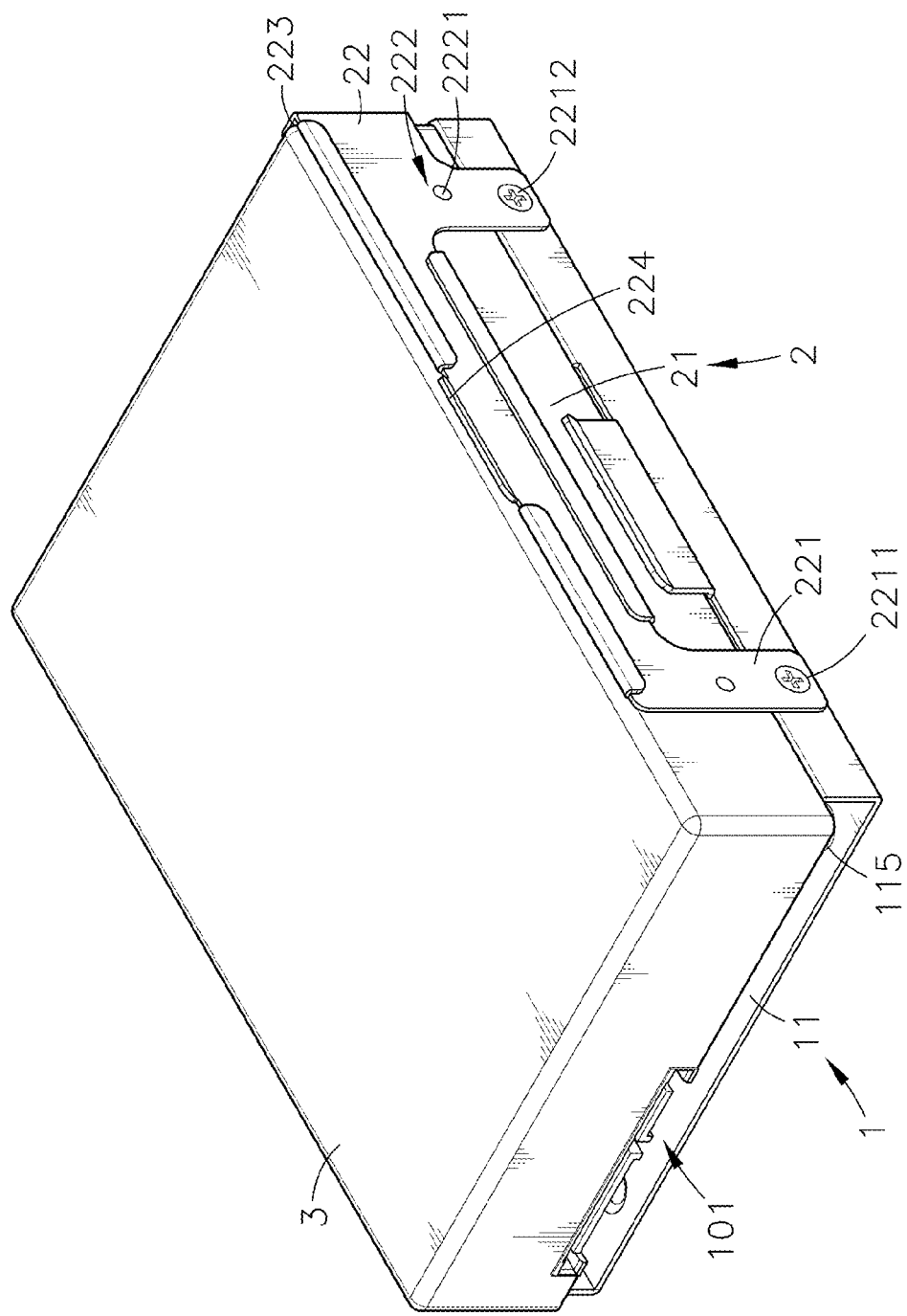
FIG. 9 is an oblique top elevational view of the present invention, illustrating the large access device mounted in the holder shell.
Figure 10:
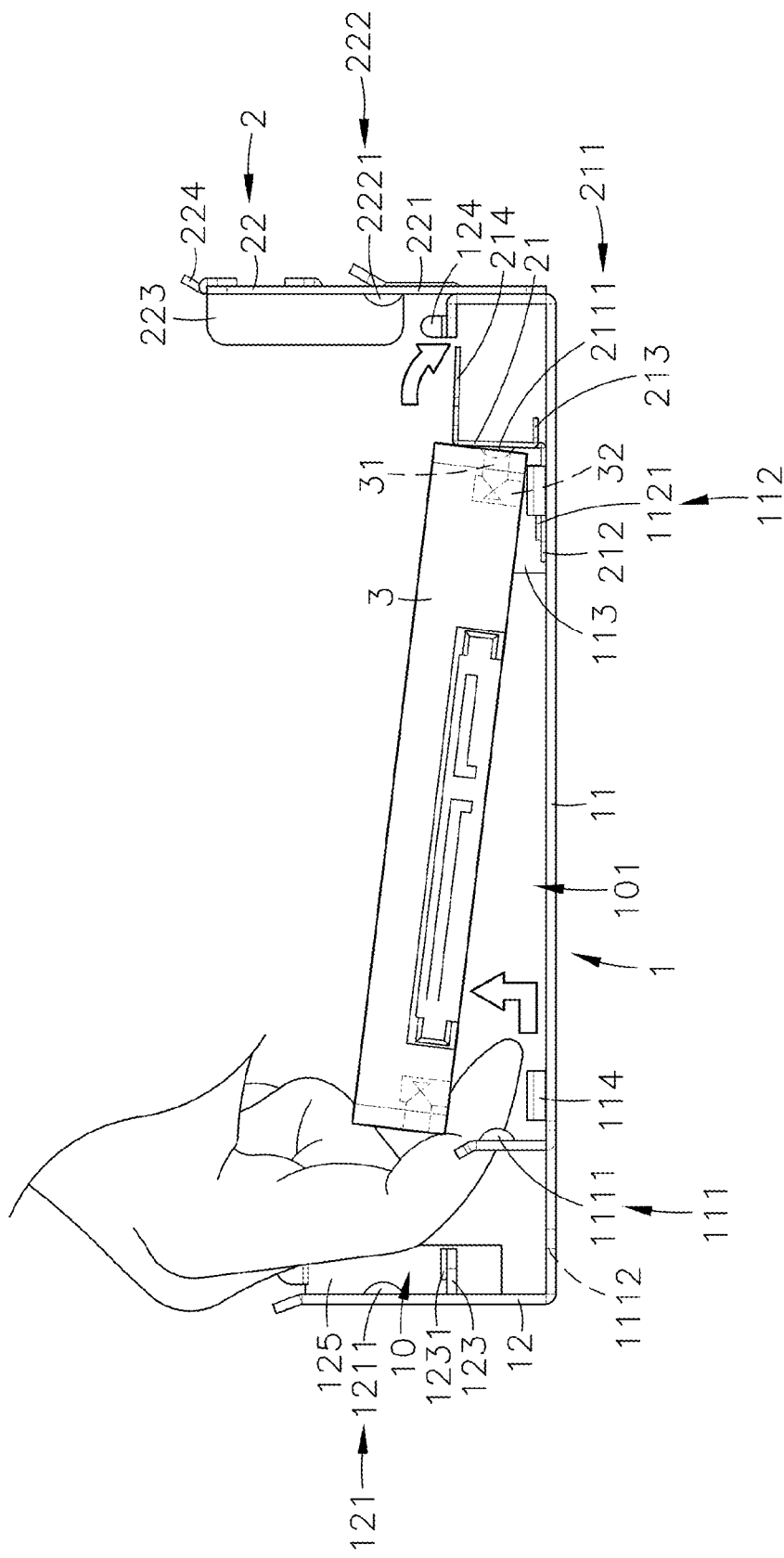
FIG. 10 is a schematic applied view of the present invention, illustrating the operation of the removal of the installed access device.

Referring to FIGS. 7-10, when mounting a large size access device 3 (for example, 3.5-inch HDD), obliquely insert one lateral side of the access device 3 into the accommodation chamber 10 of the holder shell 1 to abut against the second positioning member 121 at one side panel 12 of the holder shell 1 and to force the mounting holes 31 at one lateral side of the access device 3 into engagement with the respective raised portions 1211 of the second positioning member 121, and then force the other lateral side of the access device 3 downwardly over the fourth positioning member 222 of the second retaining plate 22 of the retaining mechanism 2 to elastically deform the second retaining plate 22, enabling the access device 3 to be supported on the horizontal supporting plates 123 above the bottom panel 11 with the rear side thereof stopped against the second stop lug 125 to prevent vibration or displacement, the upright retaining lugs 124 at the horizontal supporting plates 123 to be respectively forced into engagement with the respective position-limit holes 32 of the access device 3 and the mounting holes 31 of the access device 3 to be respectively forced into engagement with the respective raised portions 2221 of the fourth positioning member 222 of the second retaining plate 22, and thus the access device 3 is firmly secured to the inside of the accommodation chamber 10 inside the holder shell 1. Thus, this access device 3 installation procedure is simple without using screws or any hand tool.

With the design of the accommodation chamber 10 being surrounded by the bottom panel 11 and side panels 12 of the holder shell 1, the arrangement of the first positioning member 111 and the first locating member 112 on the bottom panel 11 on the holder shell 1 at opposing left and right sides, the arrangement of the first retaining plate 21 at the first locating member 112 and the second retaining plate 22 at the second locating member 122 of the holder shell 11, the design of the third positioning member 211 of the first retaining plate 21 corresponding to the first positioning member 111, the design of the first stop lug 113 and the second stop lug 125, the design of the fourth positioning member 222 of the second retaining plate 22 corresponding to the second positioning member 121 and the design of the mounting space 101 being surrounded by the first positioning member 111, the first locating member 112 and the first stop lug 113 in the accommodation chamber 10, the user can conveniently and selectively installed one of two different sizes of access devices 3 in the holder shell 1 without using screws or any hand tool.

When the user is going to remove the installed small access device 3 (for example, 2.5-inch HDD) from the mounting space 101 of the holder shell 1, press the finger strip 214 of the first retaining plate 21 to bias the first retaining plate 21, disengaging the raised portions 2111 of the third positioning member 211 from the mounting holes 31 of the small access device 3. Alternatively, the user can insert the finger into the opening 1112 in the first positioning member 111 to access to the bottom side of the small access device 3, and then lift the corresponding lateral side of the small access device 3 against the third positioning member 211 toward the second retaining plate 22, thereby hooking up the small access device 3, and thus the small access device 3 is detached from the holder shell 1.

When the user is going to remove the installed large access device 3 (for example, 3.5-inch HDD) from the accommodation chamber 10 of the holder shell 1, press the finger strip 224 of the second retaining plate 22 to bias the second retaining plate 22, disengaging the raised portions 2221 of the fourth positioning member 222 from the mounting holes 31 of the large access device 3. Alternatively, the user can insert the finger to the bottom side of the small access device 3, and then lift the large access device 3 against the fourth positioning member 222 of the second retaining plate 22, elastically outwardly biasing the second retaining plate 22 to disengage the raised portions 2221 of the fourth positioning member 222 from the mounting holes 31 of the large access device 3 thereby hooking up the large access device 3, and thus the large access device 3 is detached from the holder shell 1.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An in-box quick release access device mounting structure for selectively and detachably securing one of two different sizes of access devices, the in-box quick release access device mounting structure comprising:
   a holder shell made of a rigid material, said holder shell comprising a bottom panel, opposing first and second side panels respectively and vertically upwardly extended from two opposite lateral sides of said bottom panel, an accommodation chamber surrounded by said bottom panel and said first and second side panels, a first locating member obliquely extended from said bottom panel adjacent to said second side panel, a mounting space defined in said accommodation chamber and surrounded by a first positioning member and said first locating member, a second positioning member located in said first side panel at a relatively higher elevation than said first positioning member, and a second locating member located in said second side panel; and
   a retaining mechanism made of an elastic material and mounted in said holder shell for securing an access device, said retaining mechanism comprising a first retaining plate fastened to said first locating member and facing toward said first positioning member and a second retaining plate fastened to said second locating member and facing toward said second positioning member, said first retaining plate comprising a third positioning member corresponding to said first positioning member and a fourth positioning member corresponding to said second positioning member, said second retaining plate comprising at least one mounting leg extended from a bottom side thereof and fastened to said second locating member, and a fourth positioning member corresponding to said second positioning member.

2. The in-box quick release access device mounting structure as claimed in claim 1, wherein said first positioning member comprises at least one raised portion located at an outer wall thereof.

3. The in-box quick release access device mounting structure as claimed in claim 2, wherein said first positioning member further comprises an opening located on a middle of a top side thereof.

4. The in-box quick release access device mounting structure as claimed in claim 1, wherein said holder shell further comprises a plurality of hollow rivet columns located in said first locating member; said third positioning member of said first retaining plate of said retaining mechanism comprises at least one raised portion; said first retaining plate of said retaining mechanism comprises a bottom mounting flange perpendicularly extended from a bottom side thereof, and a plurality of rivet holes located in said bottom mounting flange and respectively fastened to said hollow rivet columns in said first locating member of said holder shell.

5. The in-box quick release access device mounting structure as claimed in claim 4, wherein said first retaining plate of said retaining mechanism further comprises two abutment lugs perpendicularly extended from the bottom side thereof in a reversed direction relative to said bottom mounting flange and respectively disposed at opposing front and rear sides, and a finger strip perpendicularly extended from a middle part of an opposing top side thereof.

6. The in-box quick release access device mounting structure as claimed in claim 1, wherein said holder shell further comprises a first stop lug vertically upwardly extended from said bottom panel at a rear side relative to said first locating member.

7. The in-box quick release access device mounting structure as claimed in claim 1, wherein said holder shell further comprises a plurality of lifting portions protruded from a top wall of said bottom panel.

8. The in-box quick release access device mounting structure as claimed in claim 1, wherein said second positioning member of said holder shell comprises at least one raised portion; said holder shell further comprises a plurality of horizontal supporting plates respectively perpendicularly extended from said first and second side panels within said accommodation chamber at an elevation above said first positioning member.

9. The in-box quick release access device mounting structure as claimed in claim 8, wherein said holder shell further comprises a plurality of bearing strips respectively extended from said horizontal supporting plates, and an upright retaining lug extended from one said bearing strip at said second side panel.

10. The in-box quick release access device mounting structure as claimed in claim 1, wherein said holder shell further comprises a second stop lug perpendicularly extended from a rear end of said first side panel.

11. The in-box quick release access device mounting structure as claimed in claim 1, wherein said second locating member comprises a plurality of mounting through holes; said second retaining plate further comprises a plurality of mounting through holes located in said at least one mounting leg, and a plurality of mounting screws respectively mounted in the mounting through holes in said at least one mounting leg and fastened to the mounting through holes of said second locating member to affix said second retaining plate to said holder shell.

12. The in-box quick release access device mounting structure as claimed in claim 1, wherein said second retaining plate of said retaining mechanism further comprises a third stop lug perpendicularly extended from a rear end thereof, and a finger strip obliquely extended from a middle part of an opposing top side thereof.

13. The in-box quick release access device mounting structure as claimed in claim 1, wherein said holder shell is a one piece member made of galvanized steel.

14. The in-box quick release access device mounting structure as claimed in claim 1, wherein said first retaining plate and said second retaining plate of said retaining mechanism are made of an elastic plastic material.

* * * * *